(No Model.) 2 Sheets—Sheet 1.
W. C. NONES.
NUT LOCK.
No. 574,213. Patented Dec. 29, 1896.
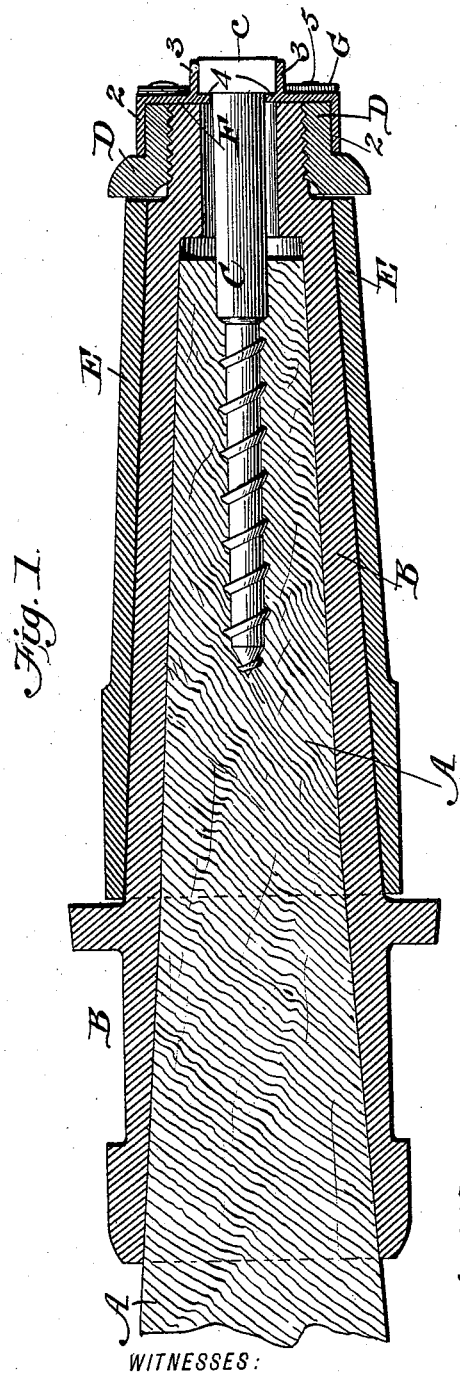
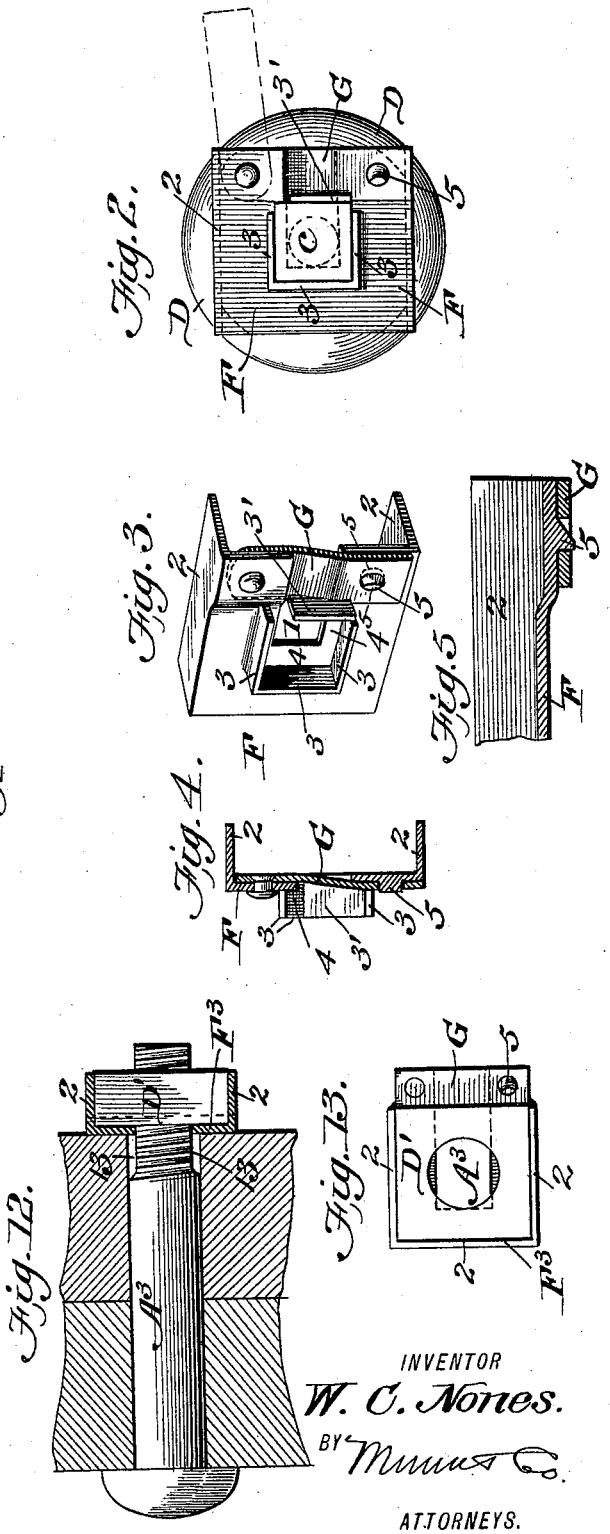
WITNESSES:
M. D. Blondel
Amos W. Hart
INVENTOR
W. C. Nones.
BY Munn & Co.
ATTORNEYS.

(No Model.) 2 Sheets—Sheet 2.
W. C. NONES.
NUT LOCK.
No. 574,213. Patented Dec. 29, 1896.
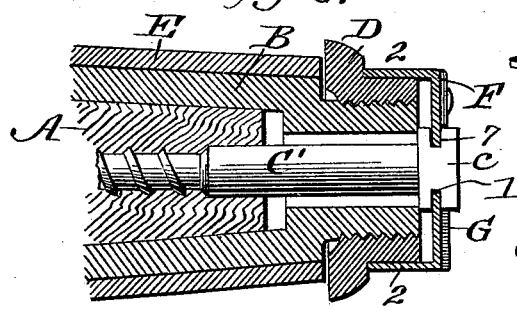
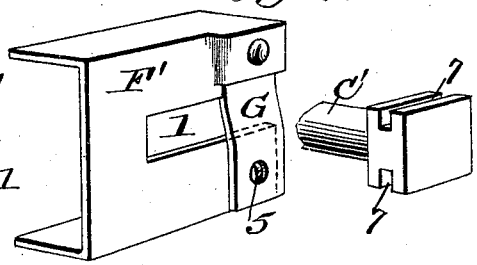
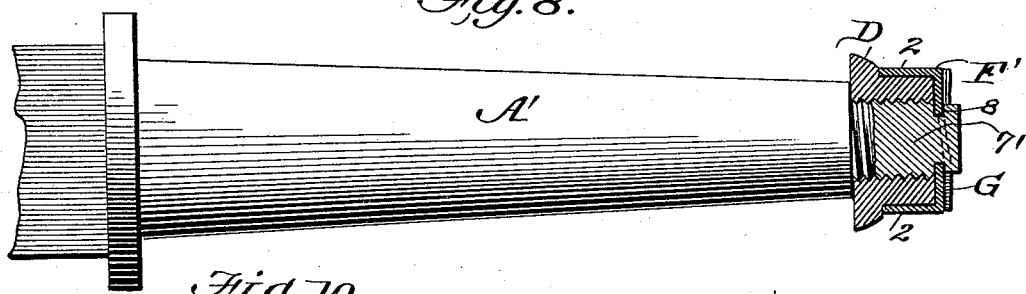
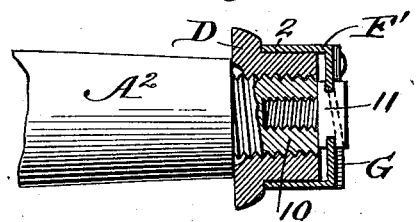
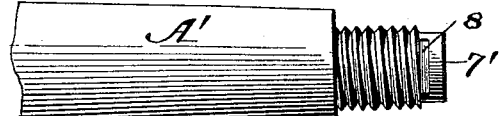
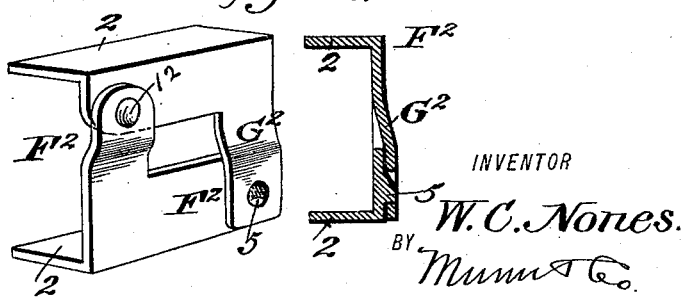
WITNESSES:
M. D. Blondel
Amos W. Hart
INVENTOR
W. C. Nones.
BY Munn & Co.
ATTORNEYS.

UNITED STATES PATENT OFFICE.

WILLIAM C. NONES, OF LOUISVILLE, KENTUCKY.

NUT-LOCK.

SPECIFICATION forming part of Letters Patent No. 574,213, dated December 29, 1896.

Application filed July 27, 1896. Serial No. 600,705. (No model.)

*To all whom it may concern:*

Be it known that I, WILLIAM C. NONES, of Louisville, in the county of Jefferson and State of Kentucky, have invented a new and Improved Nut-Lock, of which the following is a specification.

My invention is an improved device for locking nuts on axles and screw-bolts, &c. The same consists, first, (*a*) of a metal plate provided with a slot to receive the bolt, &c., and flanges adapted to embrace the nut, and (*b*) a spring-bar which is pivoted to said plate and so arranged as to close the slot and prevent the plate from becoming accidentally detached from the bolt and nut; second, of a square-headed screw skein-bolt threaded in the opposite direction of the thread in the nut to be locked and provided with parallel grooves in opposite sides of its head, to be used in combination with said plate.

In the accompanying drawings, two sheets, Figure 1 is a longitudinal section of a wooden thimble-skein wagon-axle to which my invention is applied. Fig. 2 is an end view of the same. Fig. 3 is a perspective view of my improved locking device. Fig. 4 is a transverse section of the said device. Fig. 5 is a detail section showing, enlarged, the locking engagement of the pivoted spring-bar forming part of the locking device. Fig. 6, Sheet 2, is a longitudinal section of a wooden thimble-skein axle, showing a modification of the construction illustrated in Fig. 1. Fig. 7 includes a perspective view of the modified locking device. Fig. 8 is a side view and longitudinal section of a steel or iron axle to which my invention is applied. Fig. 9 is a plan view of such axle alone. Fig. 10 shows a modification of the attachment to a steel or iron axle. Fig. 11 is a perspective view and section of a modified construction of the nut-lock proper. Fig. 12 is a sectional side view showing my invention applied to an ordinary screw-bolt and nut. Fig. 13 is a face view of the same.

I will first describe the invention shown in Figs. 1 to 5.

In Fig. 1, A indicates a wooden thimble-skein axle; B, a metal skein; C, a metal-skein bolt that screws into the reduced end of the axle through the reduced end of the skein and is provided with a square head *c*. The polygonal nut D is screwed onto the reduced threaded end of skein B to hold the hub-box E in place, as shown. The skein-bolt C and nut D are threaded, respectively, right and left, so as to turn in opposite directions, respectively, from each other when being inserted and applied.

The means for locking the nut D is the bifurcated or slotted and flanged plate F, having a locking-bar G. The body F of the locking device is preferably constructed of sheet-steel. It has an open slot 1, Fig. 3, which extends inward beyond its center and serves to receive the body of the screw-bolt C. Two opposite sides or edges of the plate F are bent inward and form parallel right-angular flanges 2, which embrace opposite sides of the nut D.

When the device is put in place on the bolt C, as shown by Figs. 1 and 2, the portions or edges 4 slide into place behind the head *c* of the skein-bolt, while the flanges 3 embrace the sides of the head, as shown in Fig. 1. It is apparent that while thus engaged the nut is locked and prevented from rotating and becoming loose. To hold the plate F in such engagement, I provide it with a fastening consisting of a spring locking-bar G, which is riveted to the plate at one side of the slot and so constructed at its free end as to be locked when adjusted at right angles to the slot 1, as shown in full lines. The means of locking it consists of a beveled lug or projection 5, (see Fig. 5,) formed on or struck up from the body of the plate, and which enters a hole or recess in the free end of the spring-bar G. The bevel of the lug 5 enables the said bar to easily ride over it when the bar is closed, but to disconnect the latter its free end must be raised off the lug 5 before it can be moved laterally. This may be most conveniently done by the aid of some pointed tool. The dotted lines, Fig. 2, indicate the open position of said bar, which permits application of or removal of the device from the skein-bolt and nut.

In Figs. 6 and 7 I show a skein-bolt C' provided with parallel grooves 7 in opposite sides of its square head to receive the inner edges 4 of the locking-plate F. The said grooves are at right angles to the axis of the bolt. It will be seen that the bar G is arranged as before described.

In Figs. 8 and 9 I illustrate the application of the invention to an iron or steel axle A'. The reduced threaded portion 7' of the journal is extended and provided with opposite parallel side grooves 8 to receive the locking-plate F', whose flanges 2 embrace the nut, as in the cases before described.

Instead of the mode of attachment shown in Figs. 8 and 9 a screw-hole may be tapped in the end of the journal A², Fig. 10, and a short screw-bolt 11 inserted therein and its head provided with grooves to receive the locking-plate F', substantially as shown in Fig. 6. In this case the short screw-bolt 11 and nut D are threaded, respectively, right and left, so as to turn in opposite directions from each other when being inserted and applied.

In Fig. 11 I illustrate a modification in which the plate F² is made in two parts and pivoted together at 12, near one corner, as shown, the spring locking-bar G² being in this case made integral with one side or arm of the plate. When in this form, the two parts of the device are preferably cut out of and struck up from sheet-steel.

In the modification shown in Figs. 12 and 13, Sheet 1, my invention is adapted to an ordinary screw-bolt A³ and nut D'. The plate F³ is slotted as before and provided with flanges 2, which, when the device is applied to a nut on its inner side, embrace two sides of the same. The bolt A³ is flattened, the thread being cut away on two opposite sides 13. It is apparent that by this construction the nut is locked or prevented from rotation. The spring fastening-bar G is pivoted and arranged as before described, except it is pivoted to the plate F and engages a lug or projection formed on or struck up from plate F, on the under side of plate F, facing the base of nut D', instead of on the outer side of said plate F, as required when applied to a thimble-skein axle or steel or iron axle.

The modified form of plate F² is shown in Fig. 11 with lug or projection on under side of plate F² instead of on outer side, is also applicable to ordinary screw-bolt A³ and nut D', as shown in Figs. 12 and 13.

What I claim is—

1. An improved device for locking nuts on axle-skein, axles, and bolts, consisting of a bifurcated metal plate, having ribs or flanges for embracing a nut, a fastening-bar which is formed of or attached to one side or arm of such plate, and means for engaging and locking it with the opposite side or arm, substantially as shown and described.

2. An improved nut-locking device composed of a bifurcated or slotted metal plate provided with flanges for embracing a nut, and a fastening device consisting of a bar pivoted to said plate, and means for engaging its free end when closed, substantially as shown and described.

3. The improved nut-locking device composed of a slotted metal plate, having flanges on one side for embracing a nut, other flanges on the opposite side for embracing a bolt-head, and a spring locking-bar pivoted to such plate, and a means for temporarily securing the bar at its free end, substantially as shown and described.

4. The improved locking device composed of the metal plate having an open slot, flanges and a lug, or projection, on its face or back and a spring fastening-bar which is pivoted to the plate, and provided with an opening at its free end, to engage said lug, as shown and described.

5. The improved locking device composed of the metal plate having an open slot, integral flanges for embracing a nut, and lug on its face or back which is beveled as and for the purpose specified, and a spring locking-bar, attached to one side or arm of said plate, and having a recess in its free end, whereby the latter is adapted to ride over and engage the lug when being closed, as shown and described.

6. The combination with a wooden axle fitted with metal thimble-skeins and nuts, of a skein-bolt provided with parallel grooves in opposite sides of its head and threaded respectively right and left and the locking device applied to the nuts on each end of such axles composed of the plate having flanges to embrace the nut and a spring fastening-bar which is pivoted to said plate, and a lug which is formed on the plate and detachably engages the free end of said bar, as shown and described.

7. The combination with an iron or steel axle fitted with nuts and having its journals extended beyond the nuts and such extensions provided with opposite parallel side grooves and the locking device applied to the nuts on each end of such axles composed of the plate having flanges to embrace the nut and a spring fastening-bar which is pivoted to said plate and a lug which is formed on the plate and detachably engages the free end of said bar as shown and described.

WILLIAM C. NONES.

Witnesses:
EDWARD C. STUESSY,
THOS. MALONE.